United States Patent [19]

Burke

[11] Patent Number: 5,542,900

[45] Date of Patent: Aug. 6, 1996

[54] IDLER ROLLER AND METHOD OF MAKING

[75] Inventor: Thomas F. Burke, Strongsville, Ohio

[73] Assignee: Jason Incorporated, Cleveland, Ohio

[21] Appl. No.: 458,341

[22] Filed: Jun. 2, 1995

Related U.S. Application Data

[62] Division of Ser. No. 303,422, Sep. 9, 1994, Pat. No. 5,493,777.

[51] Int. Cl.⁶ .................................................. B23P 15/00
[52] U.S. Cl. ........................ 492/16; 29/895.32; 492/20; 492/49
[58] Field of Search .................. 29/895.3, 895.32; 492/49; 49/16–20

[56] References Cited

U.S. PATENT DOCUMENTS

| | | | |
|---|---|---|---|
| 2,697,010 | 12/1954 | Huschmugl | 264/269 |
| 3,406,438 | 10/1968 | Reilly | 492/16 |
| 3,581,363 | 6/1971 | Roesner et al. | 29/149.5 |
| 3,711,912 | 1/1973 | Teske et al. | 492/16 |
| 3,786,549 | 1/1974 | Pott | 492/16 |
| 3,823,456 | 7/1974 | Schneider et al. | 29/148.4 |
| 3,847,260 | 11/1974 | Fowler | 492/16 |
| 3,894,323 | 7/1975 | Hamlen | 492/16 |
| 4,173,058 | 11/1979 | Stieger | 29/148.4 |
| 4,299,022 | 11/1981 | Kummerl | 29/450 |
| 4,385,683 | 5/1983 | Krupp | 492/16 |
| 4,395,142 | 7/1983 | Lobeck | 384/192 |
| 4,577,747 | 3/1986 | Martin | 198/500 |
| 4,583,272 | 4/1986 | Keller | 29/110 |
| 4,722,617 | 2/1988 | Stella et al. | 384/523 |
| 4,883,374 | 11/1989 | Rhoads et al. | 384/618 |
| 5,089,201 | 2/1992 | Takahashi | 264/135 |
| 5,114,521 | 5/1992 | Isegawa et al. | 156/242 |
| 5,133,125 | 7/1992 | Diebels et al. | 29/527.2 |
| 5,138,766 | 8/1992 | Kimura et al. | 29/895.212 |
| 5,167,068 | 12/1992 | Leino et al. | 29/895.32 |
| 5,266,257 | 11/1993 | Kildune | 264/224 |
| 5,324,248 | 6/1994 | Quigley | 492/50 |
| 5,412,847 | 5/1995 | Yaguchi | 492/16 |

OTHER PUBLICATIONS

"Encyclopedia Of Polymer Science And Engineering, vol. 1 A to Amorphous Polymers", John Wiley & Sons, pp. 1–35.
Load Runners® Idler–Rollers, Osborn® A Unit Of Jason Incorporated, pp. 2–23, Catalog.
Load Runners Idler Rollers, Osborn, Catalog.

*Primary Examiner*—Irene Cuda
*Attorney, Agent, or Firm*—Renner, Otto, Boisselle & Sklar, P.L.L.

[57] ABSTRACT

A composite idler roller has an integral internal bearing surface which interfits with the outer or tread portion of the roller. Flange seals or internal lubricant retaining grooves may be incorporated in the bearing surface. The outer or tread portion of the roller is inserted in a mold concentric with a core pin. The bearing material is injected into the space between the outer portion and the core pin. The centering of the outer portion may be by external contact with the mold or internal shoulder contact with the core pin. The core pin may be wholly or partly collapsible. The roller may have a wide variety of tread styles and may be stud or yoke mounted. In another form, the entire roller is formed of the bearing material.

9 Claims, 3 Drawing Sheets

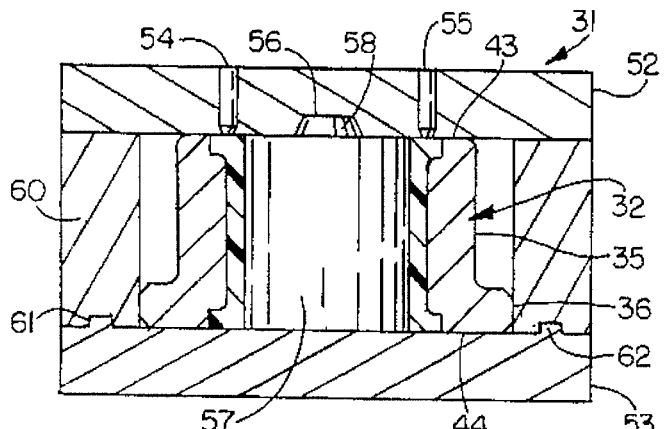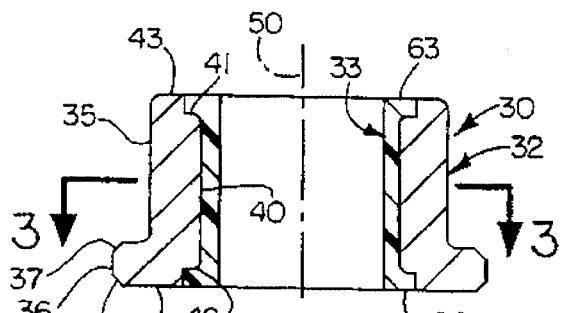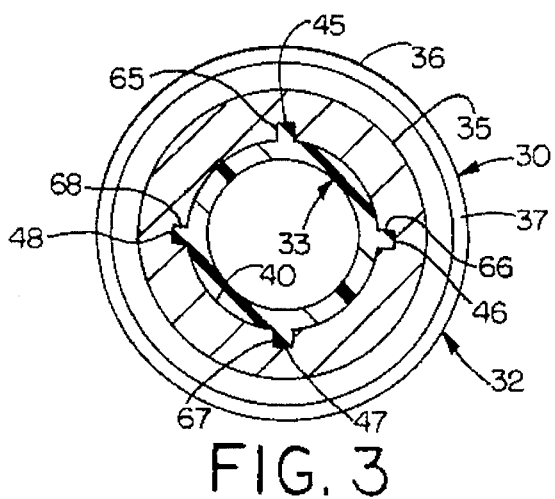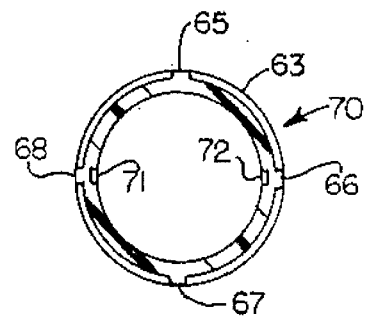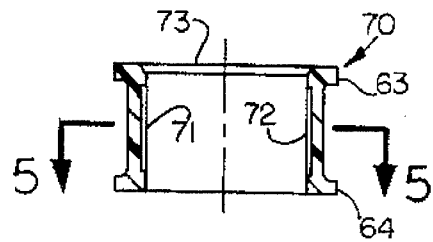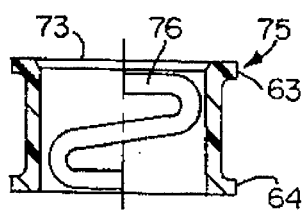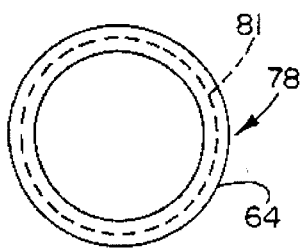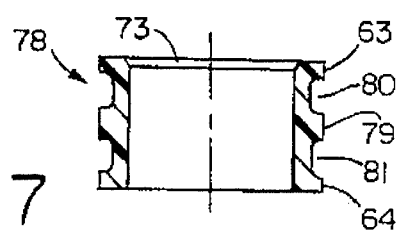

5,542,900

IDLER ROLLER AND METHOD OF MAKING

This is a division of application Ser. No. 08/303,422, filed Sep. 9, 1994, now U.S. Pat. No. 5,493,777.

DISCLOSURE

This invention relates generally as indicated to an idler roller, and more particularly to a low cost quiet running idler having improved life and load ratings.

BACKGROUND OF THE INVENTION

Idler rollers are widely used in machinery and conveyors to transfer loads. The rollers may be stud mounted from a rail or other structure where the roller projects in cantilever fashion, or yoke mounted where the stud or shaft is supported at either or both ends. A load bearing roller is mounted on the stud or shaft for rotation using a ball or roller bearing. The roller tread may have a variety of profiles, such as plain, crowned, flanged, V-groove, double V, or U-groove, depending on the application. An example of such idler rollers is the well known LOAD RUNNERS® brand idler rollers made and sold by The OSBORN Manufacturing unit of Jason Incorporated.

While having excellent load bearing capabilities, such rollers are relatively costly to make and assemble. Care has to be taken to achieve concentricity in press fit operations, and seals or shields are usually required since many idler rollers operate under heavy radial and thrust loads, at high speeds, and in a dirt, sand, or moisture environment.

Some of the drawbacks of conventional idler rollers, whether made with roller, ball, or even bronze sleeve bearings is that they require lubrication. This in turn may create a contamination problem which would limit, for example, food applications. Also any metal material is subject to corrosion or sparking which would limit both the useful life and applications. A lubricated bearing also has temperature limitations. Ball, roller, or some sleeve design bearings also may be rather noisy, not enhancing a factory environment.

With the advent of plastics, particularly plastics which have some degree of lubricity, some manufacturers have been replacing ball or needle bearings with a sleeve construction which utilizes the low coefficient of friction of some plastic materials.

However, such sleeves are usually of a multi-part construction, or may be attached to the interior of a roller by adhesion, or in a similar manner directly to a stud. The more parts, the more wear points and the greater opportunity for dirt or grit to enter between the moving parts, which would soon scour the plastic material. Such bearings have limited useful life and loading characteristics. Also such bearings are hard to make and assemble and maintain concentricity.

It would accordingly be desirable to have the simplicity and low cost of a plastic sleeve bearing construction, without the assembly steps required, and yet have longer life and higher load characteristics. It would also be desirable for the bearing and roller to be of unitary construction, with the outer tread being a integral part of the bearing assembly, eliminating a multiple part construction.

SUMMARY OF THE INVENTION

A process forms the idler roller and its internal bearing surface as an integral unitary unit. For some applications, the entire roller may be molded of the bearing material or, preferably, the internal bearing and outer track are a molded composite of two different materials, each selected for its appropriate function. In the molding process, careful concentricity is maintained, gauging the internal bearing surface from the circular exterior of the tread or roller, or from an internal shoulder. Integral sealing flanges or covers are formed, and axial and radial interfittings are employed in the molding process. The flanges or covers act as seals to assist in preventing debris from entering the bearing area, and may also serve as a containment for lubrication, if employed. The use of interfittings, which may be combined with a flange construction, ensures that the inner bearing part will not move with respect to the outer roller or tread and maintains the unitary integral construction under even high torque loads. Also, in the molding process, a wide variety of pockets or grooves may be formed on the inside of the bearing surface for lubrication retention and distribution, if desired.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

FIG. 1 is section of a mold for making rollers in accordance with the present invention;

FIG. 2 is an axial section of a flanged roller;

FIG. 3 is a transaxial section of the roller as seen from the line 3—3 of FIG. 2;

FIG. 4 is sectional view of another form of molded bearing sleeve which may be formed with the present invention, such sleeve having small internal axial grooves;

FIG. 5 is a transaxial section taken on the line 5—5 of FIG. 4;

FIG. 6 is a view similar to FIG. 4 showing another form of internal groove;

FIG. 7 is a view similar to FIG. 6 showing yet another form of molded-in-place bearing;

FIG. 8 is an axial end elevation of the bearing sleeve of FIG. 7;

DETAILED DESCRIPTION OF THE PREFERRED EMBODIMENTS

Figure 10:
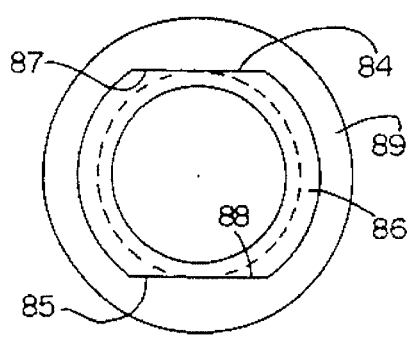
FIG. 10 is an axial elevation of a roller like that of FIG. 9 showing a flange interfit.

Referring initially to FIGS. 1, 2 and 3, a composite roller in accordance with the present invention is shown generally at 30 in FIGS. 2 and 3, and within an injection mold 31 illustrated in FIG. 1. The composite roller comprises an outer roller or tread portion 32 and an inner integrally formed bearing portion 33. The bearing portion 33 is made of a wear resistant bearing material, while the tread is made of a rolling wear and load resistant material.

As will hereinafter be appreciated, the outer rolling surface of the composite roller may have a variety of profiles designed to interfit with a variety of rails, bars, Cams, or the like. In FIGS. 1–3, the roller tread profile is that of a flanged cylindrical roller having a cylindrical rolling surface 35 and a radially projecting flange 36 at one axial end. The flange may have beveled edges as seen as 37 and 38.

The interior of the outer tread portion includes a main cylindrical interior surface 40 which terminates axially at shoulders 41 and 42 spaced slightly axially inwardly from the axial end faces 43 and 44, respectively, of the outer tread portion 32. Also formed in the interior of the tread portion are four quadrant spaced axial grooves 45, 46, 47 and 48 seen in FIG. 3. These grooves are usually slightly less but may be substantially the same radial extent or greater than the annular shoulders 41 and 42.

The exterior and interior circular surfaces of the exterior tread portion 32 of the composite roller are all carefully turned so as to be concentric with the axis 50 of the roller. This enables the composite roller to be formed with relatively simple mold parts. Referring now to FIG. 1, there is illustrated two basic mold parts 52 and 53 which are clamped together with the outer tread portion 32 therebetween. The mold part 52 includes two or more sprue openings 54 and 55 for the injection of the bearing material and a centered pilot recess 56. The mold part 53 includes a centered polished core pin 57 which has an outside diameter somewhat smaller than the inside diameter 40 of the cylindrical interior of the tread portion. The core pin has a pilot projection 58 which interfits with the pilot recess 56 in the mold part 52.

The outer tread portion 32 is inserted in the mold when open and is telescoped over the projecting core pin 57 and is positioned concentric therewith by means of an annual gauge ring 60. The gauge ring is provided with a pilot groove 61 which interfits with a pilot ridge 62 on the mold part 53. In this manner, the concentricity of the gauge ring with the core pin is ensured. In the embodiment of FIG. 1, the gauge ring contacts the largest diameter of the roller portion 32 at the tip of the flange holding the same concentric with the core pin 57. When the mold is closed as seen in FIG. 1, the core pin forms an annual enclosed space between the outer polished surface of the core pin and the interior of the tread portion 32. Into that space is injected the bearing material which forms the interior integral bearing surface of the composite roller.

When the bearing material cures, the mold is disassembled and the roller seen in FIGS. 2 and 3 is removed. The integral interior bearing liner is then formed with axial end flanges 63 and 64 which are flush with the ends 43 and 44 of the outer tread portion of the roller. Also formed are axially extending ridges 65, 66, 67 and 68 which fill the axial slots 45, 46, 47 and 48, respectively. In this manner, the bearing material forming the interior liner cannot move either axially or rotationally with respect to the outer tread portion 32. It cannot loosen and adhesive is not needed to keep the inner bearing liner in place. Also, no dirt can get between the parts of the composite roller.

Referring again to FIG. 1, it will be noted that the gauge ring 60 is of substantially the same axial extent as the roller tread portion 32. If the outer tread portion is a hard durable material such as stainless steel then the entire portion of the ring beyond that which contacts the flange is unnecessary. The gauge ring 60 will normally only extend axially to the extent shown when the outer tread portion 32 is formed of a material which would deform or otherwise be damaged by high clamp pressures. It would also be appreciated that the outer tread portion may be turned end-for-end and gauged in a similar matter on the cylindrical surface 35 rather than the largest diameter at the flange. In any event, the roller is gauged externally to ensure that the space between the outer tread portion and the exterior surface of the core pin is concentric with the exterior of the roller.

Referring now to FIGS. 4 and 5, there is illustrated another bearing style which may readily be used with the present invention. Like the bearing style of FIGS. 2 and 3, such bearing is provided with end flanges 63 and 64 and quadrant spaced ridges 65, 66, 67 and 68 interfitting with the tread portion of the roller. However, in addition the bearing 70 is provided with two diametrically opposed relatively shallow grooves on its interior surface as seen at 71 and 72. The internal grooves act as oil retention grooves and also collect any particles which might be between the stationary surface of the pintle and the moving surface of the roller. This reduces scouring of the bearing surface. In addition, the roller 70 is provided with an internal radius or bevel indicated at 73 which would correspond to an internal radius or bevel at a shoulder on the polished surface of the pintle.

FIG. 6 illustrates a bearing style 75 having an internal groove 76 which is in the form of a reverse helix. The groove 76 in the near side of the cut away bearing would simply be a mirror image of what is shown in FIG. 6. The groove 76 in the interior of the bearing sleeve 75 serves the same purpose as the two somewhat smaller grooves in the FIG. 5 embodiment collecting debris or other particles that may be on the bearing surfaces and also providing assistance in the storage and proper distribution of lubrication over the moving bearing surfaces.

In addition to the end flanges 63 and 64, the bearing style 78 seen in FIGS. 7 and 8 has a central ridge 79 forming two annular grooves 80 and 81 between the end flanges 63 and 64. The style of FIG. 7 is particularly useful where high thrust loads may be encountered. It will be appreciated that the styles of FIGS. 6 and 7 may also include the axial ridges of FIG. 3 which interfit with the grooves of the tread portion mechanically interlocking the two parts of the composite to prevent relative movement.

Figure 9:
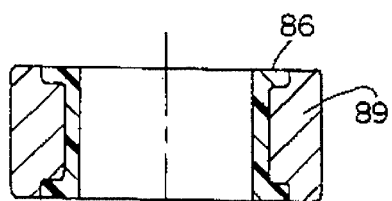
FIG. 9 is a view similar to FIG. 2 but of a composite plain tread roller.

As seen in FIGS. 9 and 10, the interfit to prevent relative rotation may be obtained by flats 84 and 85 in the bearing material flange 86 which interfit with similar flats 87 and 88 in the otherwise annular shoulder of the outer tread portion 89. The flatted flange interfit may be on both ends of the composite plain roller assembly illustrated in FIGS. 9 and 10.

Figure 11:
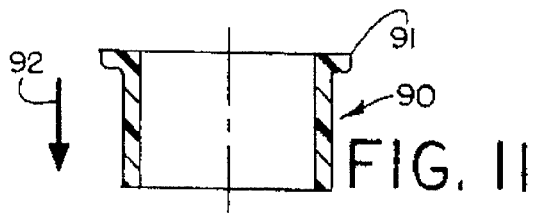
FIG. 11 is a view like that of FIG. 9 but without the roller tread and showing only a single flange.

FIG. 11 illustrates a bearing style 90 which has a flange 91 on one end only. That flange includes the opposite flats, and the composite roller looking from the top of FIG. 11 appears identical to that seen in FIG. 10. The style of FIG.

11 is particularly useful if the composite roller assembly encounters thrust loads primarily in the direction of the arrow 92.

Figure 12:
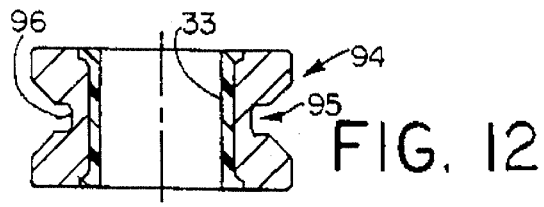
FIGS. 12–14 are views like FIG. 9 but showing alternative tread profiles.

In FIG. 12, there is illustrated a composite roller 94 having a "V" outer tread shown generally at 95. The composite roller may otherwise be identical to the flanged composite roller seen in FIG. 2 or the plain tread composite roller seen in FIG. 9. The groove 95 in the roller is designed to run, for example, on the corner of a square or rectangular rail. The crotch of the V has an enlarged annular center notch 96 for clearance purposes.

Figure 13:
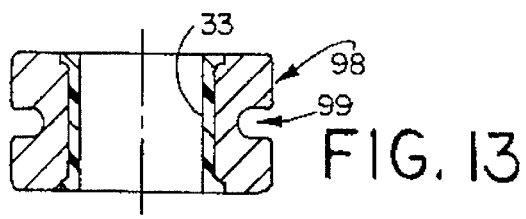

In FIG. 13, there is illustrated a composite roller 98 which has a "U" groove tread. The U groove 99 enables the roller to run on or support a rail having an edge configuration similar to but somewhat smaller than the groove shown or, alternatively to support wire or rope thus acting as a pulley.

Figure 14:
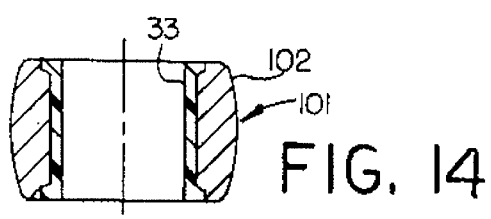

In FIG. 14, there is illustrated a composite roller 101 which is similar to the roller seen in FIG. 9 but having a crowned external surface 102 rather than the plain or cylindrical surface seen in FIG. 9.

FIGS. 15 through 20 illustrate a slightly different style of roller mounted on a pintle or stud. In each instance, the stud is identical as is the interior of the outer tread portion and the composite bearing. The only difference in the various figures 15 through 20 is in the configuration of the outer tread styles.

Figure 15:
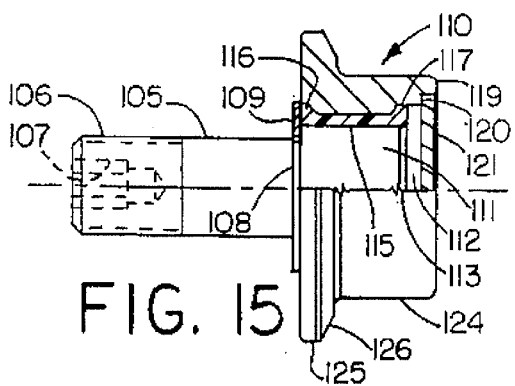
FIG. 15–19 are elevations, partially broken away and in section, of stud mounted roller assemblies in accordance with the present invention showing different tread profiles.

Referring initially to FIG. 15, the pintle includes a stud 105 having an externally threaded end 106 and in that end a blind hexagonal hole 107. The stud includes a groove 108 for a snap ring 109 which holds the composite roller 110 on enlarged polished circular surface 111. The polished surface 111 terminates in a radially extending flange 112 and a radius or bevel 113 is provided between the surface 111 and the flange.

The molded-in bearing material seen at 115 is axially coextensive with the polished surface 111 with the flange 116 of the bearing material abutting against the snap ring 109 while the flange 117 abuts against the pintle flange 112. The roller tread portion, however, extends axially beyond the bearing flange 117 telescoping over the pintle flange 112 with clearance terminating in projecting annular nose 119 which includes an internal stop shoulder 120. The stop shoulder projects slightly beyond the flange 112 of the pintle and is designed to receive a snap-in circular cover plate 121. Both the snap ring 109 and the cover plate 121 serve to protect the relatively moving bearing surfaces from the ingress of dirt, sand or other debris. They also assist in retaining lubricant. Cover plate 121 may also be used to identify the assembly, by use of molded, engraved, etc. identification.

The stud or pintle may quickly be mounted on a rail simply by inserting the stud through a hole in the rail and securing the stud in place by a nut, not shown, threaded on the exterior of the stud. The stud can be kept from rotating while the nut is tightened by means of the hexagonal blind hole 107. In some stud styles, the polished surface 111 on which the moving roller is mounted may be eccentric with respect to the axis of the stud, thus providing a means for adjusting the position of the roller with respect to the load.

FIG. 15 illustrates a flanged roller tread portion 124, the flange 125 of which is radially larger than the flange shown in FIGS. 2 or 3. The flange 125 also has a significant interior bevel as indicated at 126.

Figure 16:
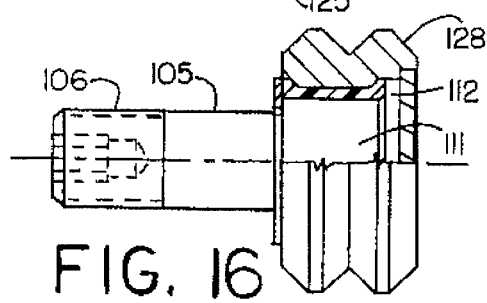
Figure 17:
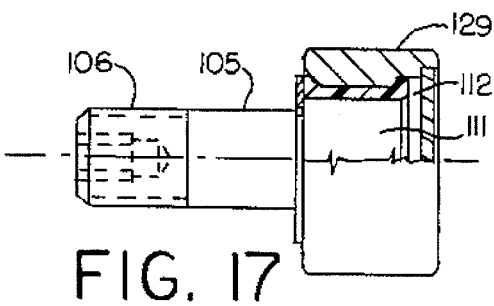
Figure 18:
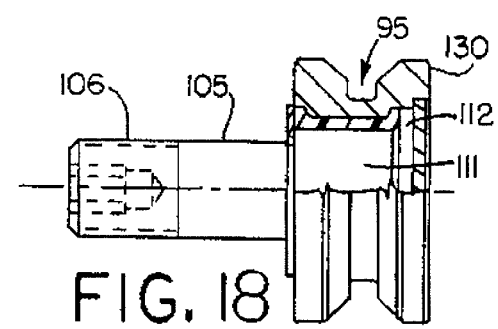
Figure 19:
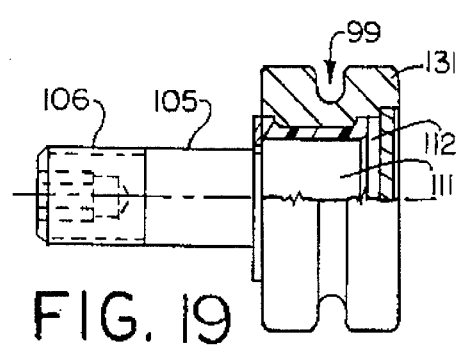

FIGS. 16 illustrates the stud mounting style composite roller utilizing a double "V" outer tread part 128. FIG. 17 illustrates a plain outer tread part 129 while FIG. 18 illustrates a "V" tread 130. FIG. 19 illustrates a "U" groove tread 131. Aside from the stud mounting style, the exterior of the roller shown in FIGS. 18 and 19 is the same as FIGS. 12 and 13, respectively.

Figure 20:
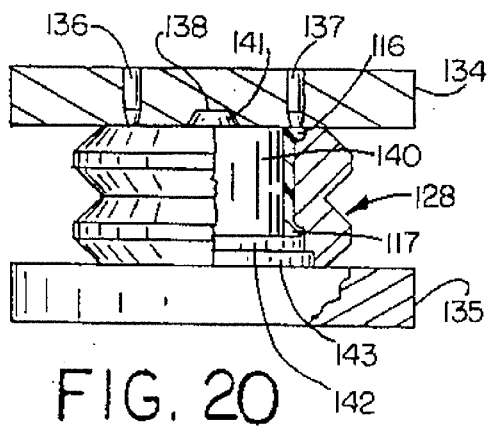
FIG. 20 is a view similar to FIG. 1 illustrating a modified form of mold wherein the tread portion of the roller is centered internally.

Referring now to FIG. 20, because of the stud or pintle style for the roller, providing internal shoulders on one axial end, the composite rollers such as shown in FIGS. 15–19 may be made in a somewhat more simplified style as shown in FIG. 20. As seen in FIG. 20, there is included one mold part 134 and another mold part 135. The mold part 134 includes sprues 136 and 137 for the injection of the bearing material and a pilot recess 138. The mold part 135 includes a polished center core pin 140, the major cylindrical surface of which forms the interior of the bearing material. The core pin includes a projection 141 fitting within the pilot recess 138 of the mold part 134. This axially aligns and positions the two mold parts.

The core pin 140 is also provided with two shoulders seen at 142 and 143. The smaller shoulder 142 forms the end face of the bearing material flange 117 and fits closely within the interior of the outer tread portion. The somewhat larger shoulder 143 seats against the shoulder 120 (see FIG. 15) against which the cover 121 snaps. In this manner, the outer tread portion 128 may simply be telescoped over the core pin when the mold is open seating the tread pin on the shoulders indicated which will automatically internally gauge the tread portion to ensure that the tread portion is concentric with the axis of the core pin as well as the axis of the roller. Clamping the parts together as seen in FIG. 20 ensures the concentricity while forming the space for the injection of the bearing material. It will be appreciated that any of the tread styles shown may be made by the process of FIG. 20.

Figure 21:
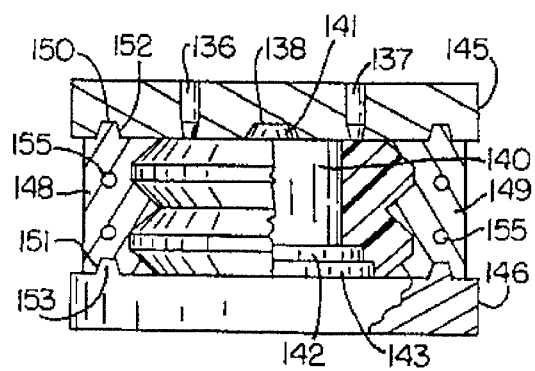
FIG. 21 is a view similar to FIGS. 1 and 20 showing a mold arrangement for forming the entire roller of the bearing material.

Referring now to FIG. 21, there is illustrated mold parts 145 and 146 which are quite similar to the mold parts 134 and 135. The mold part 145 has the sprues 136 and 137 for the injection of the bearing material. It also has the pilot recess 138 which receives the pilot projection 141 of the core pin 140 projecting from the mold part 146. However, in FIG. 21, there is no separate outer tread section which forms the mold interior for the bearing of the composite only. In FIG. 21, the entire roller is made of the bearing material as a single component in a one stage process thus eliminating any prior manufacturing step. The exterior of the double "V" roller illustrated is formed by two half round semi-cylindrical mold sections 148 and 149, each of which are provided with circular ridges 150 and grooves 151 which interfit with grooves 152 and ridges 153 in the mold parts 145 and 146, respectively. This ensures that the mold parts are centered with respect to the highly polished and circular surface 140 of the core pin. The bearing material is then injected into the cavity thus formed. The mold parts 148 and 149 may be provided with cooling passages seen at 155 to facilitate the cooling or curing of the bearing material.

Figure 22:
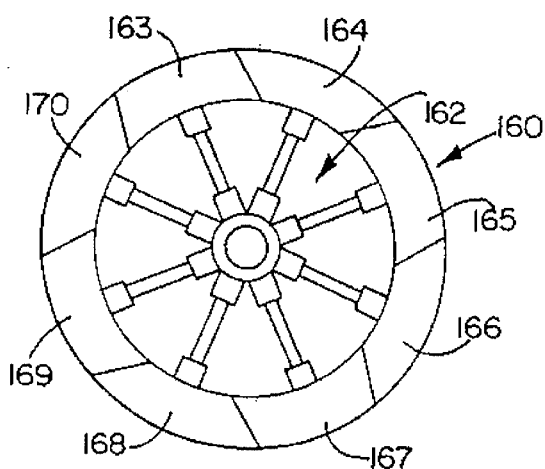
FIG. 22 is a schematic axial view of a collapsible core which may be used when forming internal grooves or irregularities on the bearing surface.
Figure 23:
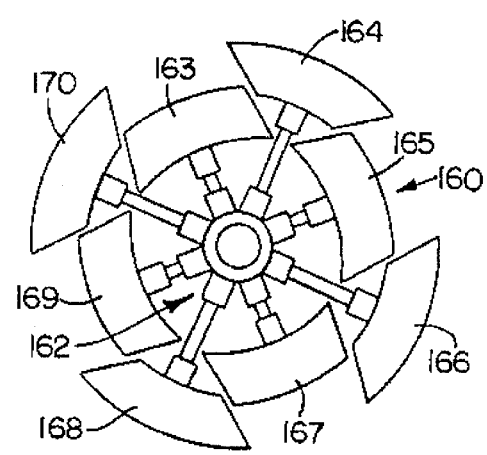
FIG. 23 is a view similar to FIG. 22 but showing the core partially collapsed.

In order to form grooves or groove patterns on the interior bearing material surface, it is desirable to have a collapsible core pin such as seen schematically at 160 in FIGS. 22 and 23. The core pin is mounted on a center mechanism 162 which supports for radial movement a series of core segments seen at 163, 164, 165, 166, 167, 168, 169 and 170. The segments interfit in the non-radial abutments illustrated in FIG. 22 so that the intermediate segments 163, 165, 167 and 169 may be withdrawn initially. If the pattern is quadrant spaced such as the diametrically opposed grooves of the FIG. 4 embodiment, further collapse of the core is unnecessary. However, collapse to the position seen in FIG. 23 provides sufficient clearance so that the remaining segments 164, 166, 168 and 170 may be collapsed slightly fully clearing any interior groove pattern placed in the interior bearing surface. The center mechanism may move the core segments radially by any suitable mechanism such as links, cams, or piston cylinder assemblies, or combinations of the above.

While a stud mounting has been illustrated, it will be appreciated that the rollers of the present invention may be mounted on a yoke where the pintle or stationary bearing surface is supported at both ends.

While it is useful to have a material which has lubricity characteristics, such characteristics are not as important as the ability to mold a hard and smooth abrasion resistant surface. Materials which may be used are acetals, nylons, polyesters, polyamides, polyurethanes, and PTFE filled. Some useful materials and their trade names are set forth below:

Verton Tread: Glass reinforced 6/6 Nylon
ISOPLAST: Polyurethane with fiber glass reinforcing
Amodel: PTFE (Teflon) Polyphthalamide
PB-45: Polyphenylene Sulfide
Peek: Polyetherether Ketone
Kevlar: Glass reinforced Kevlar As indicated, the outer tread portion of the composite roller may also be a plastic material and even the same plastic material.

It can now be seen that there is provided a simplified low cost roller assembly which can be made with 100% non-metallic components. Such roller assembly may be non-contaminating for food applications, and is also non-corroding, and non-sparking.

The composite form of the present invention may be used with a metallic or non-metallic outer tread and can also be used with metallic or a non-metallic stud. The roller assembly may be used with no lubrication and will function properly under a wide range of temperature conditions. Also, there is no metal-to-metal contact, and a significant noise reduction, particularly when compared to ball or roller bearings, or metallic sleeve bearings. The roller also has a longer service life at increased load as compared to separate plastic sleeve bearings.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

What is claimed is:

1. An idler roller assembly comprising a pintle having a bearing surface, a composite idler roller mounted on said pintle, said composite idler roller comprising an annular tread of wear resistant material having an annular interior opening, a molded-on internal sleeve of bearing material sealed and interfitting with said annular tread in said annular interior opening to form a unitary composite roller, said bearing material having a smooth internal bearing surface directly supporting said roller for rotation on said bearing surface of said pintle.

2. An assembly as set forth in claim 1 wherein said pintle is a stud.

3. An assembly as set forth in claim 1 including the interfittings between the tread and injected bearing material to facilitate the integration of the parts of the composite idler roller.

4. An assembly as set forth in claim 3 wherein said interfittings include interfitting grooves and ridges extending axially of the roller.

5. An assembly as set forth in claim 3 wherein said interfittings include flats.

6. An assembly as set forth in claim 1 including indentations on said smooth internal bearing surface.

7. An assembly as set forth in claim 6 wherein said indentations include axial grooves in the smooth internal bearing surface.

8. An assembly as set forth in claim 6 wherein said indentations include one or more grooves in the smooth internal bearing surface extending both axially and circumferentially.

9. An assembly as set forth in claim 1 wherein said bearing material provides a hard and abrasion resistant internal bearing surface.

\* \* \* \* \*